Figure 1:
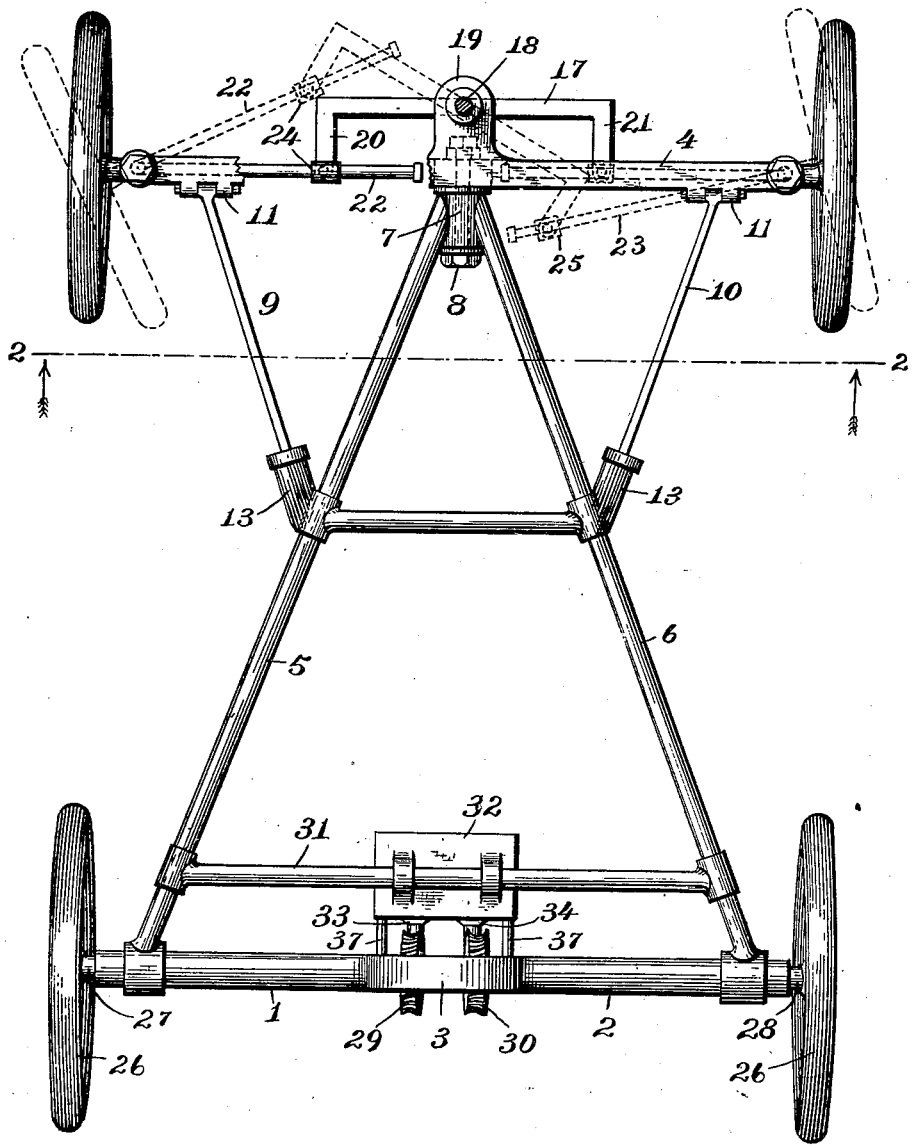

No. 731,022. PATENTED JUNE 16, 1903.
P. J. COLLINS.
MOTOR VEHICLE.
APPLICATION FILED JAN. 29, 1902. RENEWED MAY 19, 1903.
NO MODEL. 2 SHEETS—SHEET 1.

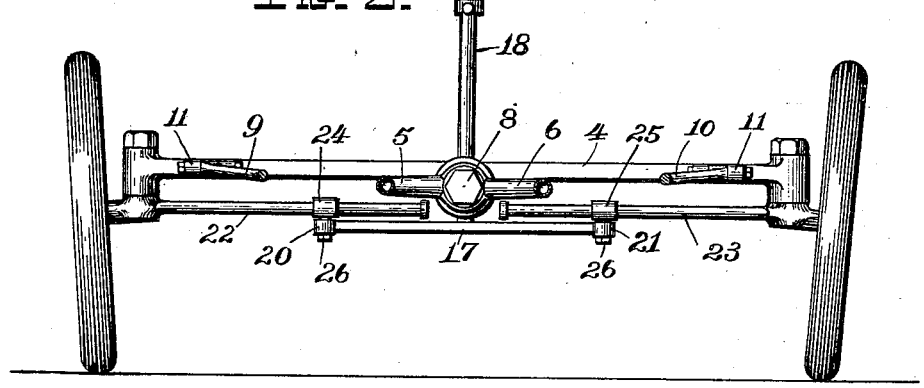
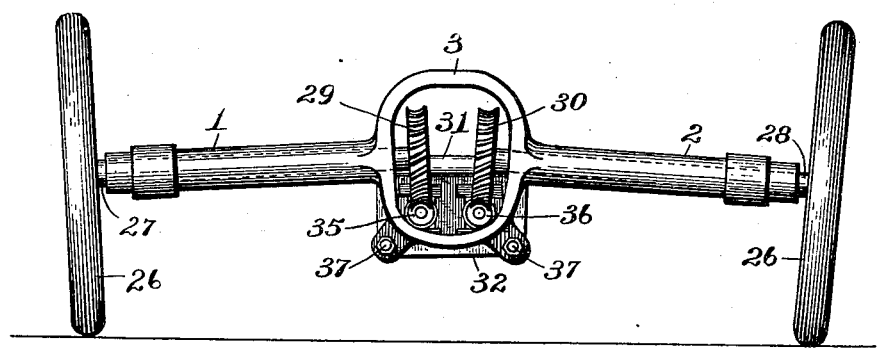
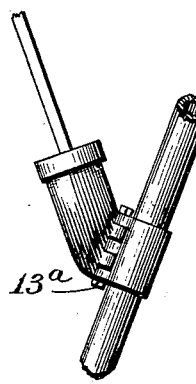
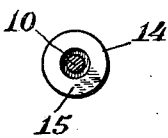
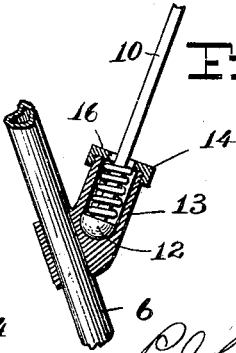

No. 731,022. Patented June 16, 1903.

UNITED STATES PATENT OFFICE.

PATRICK J. COLLINS, OF SCRANTON, PENNSYLVANIA, ASSIGNOR OF ONE-HALF TO CHRISTOPHER G. BOLAND, OF SCRANTON, PENNSYLVANIA.

MOTOR-VEHICLE.

SPECIFICATION forming part of Letters Patent No. 731,022, dated June 16, 1903.

Application filed January 29, 1902. Renewed May 19, 1903. Serial No. 157,833. (No model.)

*To all whom it may concern:*

Be it known that I, PATRICK J. COLLINS, a citizen of the United States, residing at Scranton, in the county of Lackawanna, State of Pennsylvania, have invented certain new and useful Improvements in Motor-Vehicles, of which the following is a specification.

This invention relates to improvements in the steering mechanism and frame of automobiles whereby the guiding of the vehicle is facilitated and the strains upon the frame are lessened.

The invention also comprises an improved arrangement of driving and steering motors whereby the two parts of the rear axle may be arranged at an angle to one another in order to give the required set to the wheels.

In the accompanying drawings, which illustrate the invention, Figure 1 is a plan view of the vehicle-frame. Fig. 2 is a section on the line 2 2 of Fig. 1. Fig. 3 is a rear view of the driving-wheels and driving mechanism. Fig. 4 is a detail view showing one of the sockets for receiving the rear ends of the brace-rods. Fig. 5 is a view showing the cap of the socket, and Fig. 6 is a view showing a socket pivoted to the reach of the vehicle-frame.

Referring to the drawings, 1 and 2 indicate the two halves of the rear stationary axle, which are connected by a yoke 3 and form a part of the frame. The rear axle is connected with the forward stationary axle 4 by reaches 5 and 6, which are secured at their forward ends to a central hub or bearing 7, said hub being journaled upon a stud or bolt 8, which is secured horizontally in the center of the fixed axle 4, as indicated in dotted lines in Fig. 1. This pivotal connection between the forward axle and the rear axle permits relative movement of the forward and rear wheels in vertical planes.

In order to brace the forward axle for the purpose of preventing strains upon the pivotal bolt 8 when the wheels meet with obstructions, brace-rods 9 and 10 are arranged between the opposite ends of the forward stationary axle and the reaches 5 and 6, respectively, these brace-rods being pivotally connected to the axle and to the reaches. As shown, the brace-rods are connected to the axle by hinge-joints 11, and the rear ends of the rods are, as shown in Fig. 4, provided with hemispherical bearings 12, which fit within sockets 13, secured to the reaches 5 and 6. Each socket is provided with a cap 14, threaded onto its outer end and having a slot 15, through which the brace-rod extends. Between the cap and the head 12 upon the rod is arranged a compression-spring 16. A yielding connection is thus provided between the brace-rod and the reach. When the forward axle is in its horizontal position, the head 12 rests against the base of the socket, and thereby braces the axle. When, however, an obstruction is met with upon the road which causes either of the forward wheels to rise or fall, it will be apparent that the turning of the axle about the pivotal bolt 8 will increase the distance between the hinges 11 and the bases of the sockets 13. By connecting the brace-rods and the reaches in the manner shown in Fig. 4 the rods are made extensible to accommodate the movement of the forward axle. In passing over ordinary obstructions the vertical movement of the wheels is so slight that the heads 12 will ordinarily remain against the bases of the sockets; but when a considerable movement takes place, unless some provision is made for the extension of the brace-rods, the parts are apt to bind and become strained. By arranging the ends of the rods within sockets and interposing strong compression-springs between the caps and the heads of the rods, as shown in Fig. 4, the rods may turn pivotally and also move outwardly against the action of the springs when the axle 4 turns about the bolt 8. This movement of the axle relatively to the reach-bars, it will be noted, causes both of the brace-bars to draw outwardly against the springs, so that the tension upon each of the rods is substantially the same and the strain upon the pivot-bolt 8 is relieved.

The steering lever or fork 17, as shown, is connected to a steering-rod 18, which is pivotally mounted in a projection 19, which extends forwardly from the central part of the fixed axle 4, and the opposite arms 20 and 21 of this steering-lever are turned rearwardly and connected to a pair of half-axles 22 and 23, respectively, by sleeves 24 and 25, which slide upon the half-axles and are pivotally connected to the arms of the steering-lever by studs 26 upon the sleeves, which pass through suitable eyes in the lever. The normal position of the steering-lever is shown in full lines in Fig. 1 and in a deflected position in dotted lines in said figure. It will be noted that when the steering-lever is turned into the position shown in dotted lines the half-axle 22 will be turned at a greater angle to the stationary axle 4 than the half-axle 23, so that in turning a corner the inner wheel is deflected so as to turn in the arc of a smaller circle than the outer wheel. When the lever is turned in the opposite direction, the half-axle 23 will of course be turned through a greater angle from its normal position than the half-axle 22. This difference in the angular movements of the half-axles, which is necessary for steering purposes, is due to the location of the pivotal point of the steering-lever in front of the ends of the lever, which are in sliding engagement with the half-axles. One advantage of this construction is that the leverage upon the axles increases as the steering-lever is moved from its normal position, whereas in the ordinary steering devices used upon automobiles the leverage continually decreases with the movement of the steering-lever from its normal position. When the lever is moved into the position shown in dotted lines in Fig. 1, for instance, it will be seen that the sleeve 25 moves continuously toward the free end of the axle 23, thus increasing the leverage on said axle, while the sleeve 24 moves slightly away from the free end of the axle and then toward said free end. The leverage upon the axle of the inner wheel in turning a corner will slightly decrease where a wide turn is made, or it will increase where a sharp turn is made; but in any event the leverage upon the axle of the outer wheel always increases with the angle to which the steering-lever is turned. It will also be noted that as the sleeve upon the axle of the outer wheel moves toward the free end of the axle the axle becomes locked against movement by obstructions upon the road. When the sleeve 25, for instance, approaches the end of the axle 23, the line passing through the steering-post 18, which is the pivotal point of the lever, and through the pivot of the sleeve 25 is nearly at right angles to the center line of the axle 23, and the latter becomes locked against movement by obstructions. The movement of the axles by the lever, nevertheless, is as easily accomplished in one position as in another.

Instead of pivoting the steering-lever in front of the line passing through the pivotal point of the half-axles the lever may be pivoted upon the axle 4 midway between the steering-knuckles, in which case the ends of the half-axles which are in sliding engagement with the lever will be offset rearwardly. This arrangement of offset-axles is illustrated in my application Serial No. 121,850.

The rear wheels 26 and 27 of the vehicle are mounted upon shafts or axles 27 and 28, respectively, which are journaled within the parts 1 and 2 of the tubular stationary axle. The inner ends of these axles 27 and 28 are fitted with worm-gears 29 and 30, respectively, within the yoke 3. Suspended from a cross-bar 31 upon the frame of the vehicle or otherwise suitably supported by said frame is an electric motor 32, similar to the one shown in my Patent No. 655,852, having two parallel armatures 33 and 34, upon the shafts of which are arranged worms 35 and 36, which engage the worm-wheels 29 and 30, respectively. The motor, as shown in the drawings, is connected to the yoke by suitable rods 37. The armatures are independently movable, and their speeds may be varied relatively to one another by a switching device operated by the turning of the steering-post. The devices for controlling the speeds of the motors relatively to one another for steering purposes form no part of the present invention, and are therefore not illustrated. The connection of the parallel armatures to the driving-shafts through the medium of worm-gearing permits the shafts to be arranged at an angle to one another, as shown in Fig. 2. The armatures rotate at comparatively high speeds, and the motor therefore may be made of very light weight in proportion to its power. Instead of fixing the sockets 13 rigidly to the frame, as shown in Figs. 1 and 4, the sockets may be connected by hinge-joints 13$^a$, as shown in Fig. 6.

Having described my invention, what I claim, and desire to secure by Letters Patent, is—

1. In a motor-vehicle, the combination with a pair of pivoted axles of a steering-lever pivoted in front of the pivotal points of the axles and having rearwardly-turned arms in sliding engagement with the axles.

2. In a motor-vehicle the combination with a frame having a forward axle-support pivoted transversely thereon, of a pair of extensible brace-rods pivotally connecting the ends of the support with a fixed part of the frame.

3. In a motor-vehicle the combination with a frame having a forward axle-support pivoted thereon of brace-rods pivoted to said support and a fixed part of the frame, and spring connections between said rods and the frame.

4. The combination with a vehicle-frame comprising reach-bars and a forward axle-support pivotally connected thereto, of sockets secured to the reach-bars, brace-rods hinged to the support and extending into the sockets, and springs interposed between the outer ends of the sockets and the ends of the rods within the sockets.

5. The combination with a vehicle-frame having a forward axle-support pivotally connected thereto, of brace-bars extending between and pivotally connected to the ends of the support and a fixed part of the frame, fixed sockets within which one end of each rod is arranged, and springs interposed between the ends of the rods and the outer ends of the sockets.

In testimony whereof I affix my signature in presence of two witnesses.

PATRICK J. COLLINS.

Witnesses:
 GEORGE M. JONES,
 M. F. SANDO.